United States Patent
Banno et al.

(10) Patent No.: US 11,566,180 B2
(45) Date of Patent: Jan. 31, 2023

(54) COMPOSITION AND FLAME-RETARDANT RESIN COMPOSITION

(71) Applicant: ADEKA CORPORATION, Tokyo (JP)

(72) Inventors: Keisuke Banno, Saitama (JP); Naoko Tanji, Saitama (JP); Yutaka Yonezawa, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 16/757,287

(22) PCT Filed: Oct. 31, 2018

(86) PCT No.: PCT/JP2018/040512
§ 371 (c)(1),
(2) Date: Apr. 17, 2020

(87) PCT Pub. No.: WO2019/093204
PCT Pub. Date: May 16, 2019

(65) Prior Publication Data
US 2021/0189244 A1    Jun. 24, 2021

(30) Foreign Application Priority Data
Nov. 10, 2017  (JP) .............................. JP2017-217770

(51) Int. Cl.
| | | |
|---|---|---|
| C09K 21/04 | (2006.01) | |
| C08K 3/22 | (2006.01) | |
| C08K 3/32 | (2006.01) | |
| C08K 3/34 | (2006.01) | |
| C08K 5/52 | (2006.01) | |
| C08K 13/02 | (2006.01) | |
| C08L 23/12 | (2006.01) | |
| C09K 21/02 | (2006.01) | |
| C09K 21/12 | (2006.01) | |

(52) U.S. Cl.
CPC .............. *C09K 21/04* (2013.01); *C08K 3/22* (2013.01); *C08K 3/32* (2013.01); *C08K 3/34* (2013.01); *C08K 5/5205* (2013.01); *C08K 13/02* (2013.01); *C08L 23/12* (2013.01); *C09K 21/02* (2013.01); *C09K 21/12* (2013.01); *C08K 2003/2296* (2013.01); *C08K 2003/323* (2013.01); *C08K 2003/343* (2013.01); *C08K 2201/014* (2013.01); *C08L 2201/02* (2013.01); *C08L 2207/324* (2013.01)

(58) Field of Classification Search
CPC ............. C08K 3/34; C08K 5/5205; C08K 2201/014
See application file for complete search history.

(56) References Cited

U.S. PATENT DOCUMENTS

| | | | |
|---|---|---|---|
| 2007/0176154 A1* | 8/2007 | Murase .............. | C08K 5/34928 252/601 |
| 2008/0093107 A1* | 4/2008 | Amigouet .............. | C09K 21/02 174/121 A |
| 2010/0249286 A1* | 9/2010 | Yamaki ................ | C08K 5/0066 524/100 |
| 2014/0200292 A1 | 7/2014 | Okita et al. | |
| 2014/0235767 A1 | 8/2014 | Hatanaka et al. | |

(Continued)

FOREIGN PATENT DOCUMENTS

| CN | 103304992 A | * | 9/2013 |
|---|---|---|---|
| CN | 103827197 A | | 5/2014 |
| CN | 103842444 A | | 6/2014 |
| CN | 104870613 A | | 8/2015 |

(Continued)

OTHER PUBLICATIONS

Google Patents translation of JP 2010-222402 (2010, 13 pages).*
Google Patents translation of CN 107286563 (2017, 8 pages).*
Machine translation of CN 103304992 (2013, 6 pages).*

(Continued)

*Primary Examiner* — Brieann R Johnston
(74) *Attorney, Agent, or Firm* — Nixon & Vanderhye

(57) ABSTRACT

Disclosed is a composition that can impart a drip preventing effect together with an excellent heat release suppressing effect to a resin, and that enables the resin to exhibit an excellent color tone, by being mixed with the resin. The composition includes a component (A) and/or a component (B), and a component (C). It is preferable that the composition contains the component (C) in an amount of 0.1 to 50 parts by mass relative to 100 parts by mass of a total of the components (A) and (B). The component (A) is a (poly) phosphate compound represented by General Formula (1).

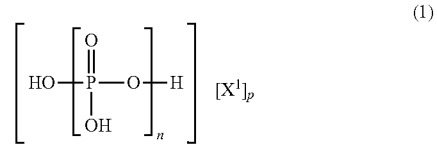

The component (B) is a (poly)phosphate compound represented by General Formula (3).

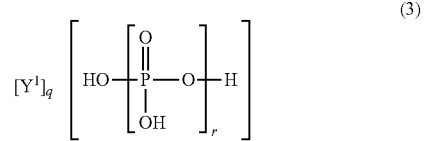

The component (C) is a hydrous magnesium silicate.

20 Claims, No Drawings

(56) References Cited

U.S. PATENT DOCUMENTS

2014/0288217 A1     9/2014    Hatanaka et al.
2015/0337204 A1* 11/2015    Yamazaki .............. C08K 5/053
                                                          524/100

FOREIGN PATENT DOCUMENTS

| CN | 107286563 A * | 10/2017 |
|---|---|---|
| EP | 2 295 501 A1 | 3/2011 |
| EP | 2762532 A1 | 8/2014 |
| JP | S53-112924 A | 10/1978 |
| JP | S53-113196 A | 10/1978 |
| JP | S57-158242 A | 9/1982 |
| JP | 2010-184974 A | 8/2010 |
| JP | 2010-222402 A | 10/2010 |
| JP | 2016-003248 A | 1/2016 |
| KR | 2014-0070579 A | 6/2014 |
| TW | 201317330 A | 5/2013 |
| WO | 2013/047618 A1 | 4/2013 |

OTHER PUBLICATIONS

Pappalardo (The synergistic effect of organically modified sepiolite in intumescent flame retardant polypropylene. European Polymer Journal, 76,2016, pp. 196-207).*
Kaynak (Thermal characterization and flammability of polypropylene containing sepiolite-APP combinations, e-Polymers, 17(4), Mar. 2017, pp. 341-348).*
International Search Report, dated Feb. 5, 2019, from corresponding PCT application No. PCT/JP2018/040512.

* cited by examiner

COMPOSITION AND FLAME-RETARDANT RESIN COMPOSITION

TECHNICAL FIELD

The present invention relates to a composition that contains a phosphate and a hydrous magnesium silicate, and a flame retardant resin composition that contains the composition.

BACKGROUND ART

Synthetic resins have conventionally been used in a wide variety of applications such as construction materials, automobile parts, wrapping materials, agricultural materials, housing materials for household appliances, and toys due to their excellent chemical and mechanical properties. However, most synthetic resins are flammable substances, and thus they are required to be flame retardant depending on the application of the synthetic resins. As a method for imparting flame retardancy to a resin, a method is widely known in which a halogen-based flame retardant agent, an inorganic phosphorus-based flame retardant agent (as typified by red phosphorus or a polyphosphoric acid-based flame retardant agent such as ammonium polyphosphate), an organic phosphorus-based flame retardant agent (as typified by a triaryl phosphate ester compound), metal hydroxides, and antimony oxides and melamine compounds that are flame retardant aids are used alone or in combination.

In particular, an intumescent-based flame retardant agent is known that is composed mainly of salts of polyphosphoric acid or pyrophosphoric acid and nitrogen-containing compounds and forms a surface swelling layer (intumescent layer) during combustion to suppress diffusion of decomposition products and heat transfer and thereby exhibit flame retardancy. Such a flame retardant agent is disclosed in Patent Literature 1, for example.

Furthermore, Patent Literature 2 discloses a resin composition containing a (poly)phosphate and a layered silicate. The carbon monoxide concentration of this resin composition during combustion is suppressed, and thus the composition is suitable for use as a construction material and the like.

CITATION LIST

Patent Literatures

Patent Literature 1: US 2014200292A1
Patent Literature 2: JP 2010-222402A

SUMMARY OF INVENTION

Technical Problem

Incidentally, there is increasing demand for flame retardancy. Furthermore, the required level of flame retardancy varies according to the application, for example, the required level of flame resistance of railroad cars is higher than that of construction materials. Also, in various applications where resin materials are used, resin compositions are required to have higher levels of flame retardancy. For example, there is increasing demand not only for a drip preventing effect in the UL-94 vertical combustion test but also for a heat release suppressing effect in evaluation using the cone calorimeter method.

However, conventional flame retardant agents described above are insufficient in terms of achieving a heat release suppressing effect together with a drip preventing effect.

It is an object of the present invention to provide a composition that can impart a heat release suppressing effect together with a drip preventing effect and excellent flame retardancy to a resin by being mixed with the resin, and a flame retardant resin composition that contains the composition and a resin and exhibits excellent flame retardancy.

Solution to Problem

The inventors of the present invention conducted in-depth studies on a configuration that solves the problems described above, and, surprisingly, it was found that, when a composition that contains a specific (poly)phosphate and a hydrous magnesium silicate in combination is mixed with a resin, the composition exhibits not only a drip preventing effect but also an excellent heat release suppressing effect.

The present invention has been made based on the findings described above, and provides a composition including a component (A) below and/or a component (B) below, and a component (C) below:

the component (A) being a (poly)phosphate compound represented by General Formula (1) below

[Chem. 1]

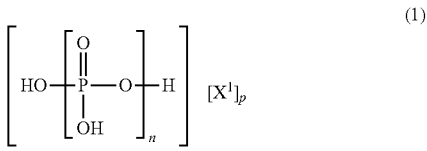

(wherein n represents a number of 1 to 100, $X^1$ represents ammonia or a triazine derivative that is represented by General Formula (2) below, and p represents a number that satisfies $0 < p \leq n+2$)

[Chem. 2]

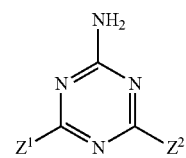

(wherein $Z^1$ and $Z^2$ each independently represent a group selected from the group consisting of a $—NR^1R^2$ group, a hydroxyl group, a mercapto group, a linear or branched alkyl group having 1 to 10 carbon atoms, a linear or branched alkoxy group having 1 to 10 carbon atoms, a phenyl group, and a vinyl group, and $R^1$ and $R^2$ each independently represent a hydrogen atom, a linear or branched alkyl group having 1 to 6 carbon atoms, or a methylol group);

the component (B) being a (poly)phosphate compound represented by General Formula (3) below

[Chem. 3]

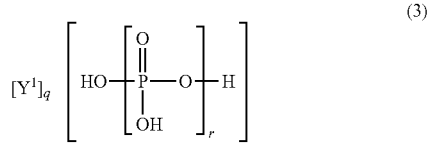
(3)

(wherein r represents a number of 1 to 100, $Y^1$ represents diamine containing $[R^3R^4N(CH_2)_mNR^5R^6]$, piperazine, or a piperazine ring, $R^3$, $R^4$, $R^5$ and $R^6$ each independently represent a hydrogen atom, or a linear or branched alkyl group having 1 to 5 carbon atoms, m represents an integer of 1 to 10, and q represents a number that satisfies $0<q\leq r+2$); and the component (C) being a hydrous magnesium silicate.

Also, the present invention provides a flame retardant agent containing the above-described composition.

Also, the present invention provides a flame retardant resin composition containing the flame retardant agent in an amount of 10 to 400 parts by mass relative to 100 parts by mass of the resin.

Also, the present invention provides a molded article formed from the flame retardant resin composition.

Also, the present invention provides a method for imparting flame retardancy to a resin, the method including mixing the composition with a resin.

Also, the present invention provides use of the composition as a flame retardant agent.

Advantageous Effects of Invention

According to the present invention, it is possible to provide a composition that can impart a drip preventing effect, an excellent heat release suppressing effect, and excellent flame retardancy to a resin by being mixed with the resin, and a flame retardant resin composition that contains the composition and a resin and exhibits excellent flame retardancy.

DESCRIPTION OF EMBODIMENTS

Hereinafter, the present invention will be described in detail by way of a preferred embodiment thereof.

The term "flame retardancy" used in this specification refers to the property of a substance being difficult to ignite, or being capable of ignition but causing a flame to spread at a very low combustion speed even when combustion continues, and thereafter being capable of self-extinguishment. Preferably, it refers to a property that is highly evaluated in terms of flammability as defined by the UL-94V standard described in Examples of this specification, and that has a low total heat release or low peak heat release rate measured using a cone calorimeter in accordance with ISO 5660. Specifically, it refers to a property with a rating of at least V-1, and preferably a rating of V-0, in flammability rating according to the UL-94V standard. Furthermore, it refers to a property with a total heat release of 35 MJ·m$^{-2}$ or less and a peak heat release rate of 85 kW·m$^{-2}$ or less in 10 minutes measured using a cone calorimeter in accordance with ISO 5660.

The term "flame retardant agent composition" refers to a composition that contains one or more flame retardant agents. The term "flame retardant resin composition" refers to a composition that has the flame retardancy described above, and contains at least one synthetic resin.

The term "(poly)phosphoric acid" in the (poly)amine phosphate is a collective term for monophosphoric acid and polyphosphoric acid.

A feature of the composition according to the present invention is that it is a composition that contains a component (A) below, a component (B) below, and a component (C) below, or is a composition that contains the component (A) or the component (B) below, and the component (C) below.

First, the component (A) that is a composition of the present invention will be described.

A (poly)phosphate compound represented by General Formula (1) above used as the component (A) is a salt of (poly)phosphoric acid and ammonia, or a salt of (poly) phosphoric acid and a triazine derivative represented by General Formula (2) above.

Examples of the linear or branched alkyl group having 1 to 10 carbon atoms represented by $Z^1$ and $Z^2$ in General Formula (2) above include methyl, ethyl, propyl, isopropyl, butyl, secondary butyl, tertiary butyl, isobutyl, amyl, isoamyl, tertiary amyl, hexyl, cyclohexyl, heptyl, isoheptyl, tertiary heptyl, n-octyl, isooctyl, tertiary octyl, 2-ethylhexyl, nonyl, decyl, and other groups.

Examples of the linear or branched alkoxy group having 1 to 10 carbon atoms represented by $Z^1$ and $Z^2$ in General Formula (2) above include groups induced from the alkyl groups.

Furthermore, examples of the linear or branched alkyl group having 1 to 6 carbon atoms represented by $R^1$ and $R^2$ in the —NR$^1$R$^2$ group that may be represented by $Z^1$ and $Z^2$ include those with 1 to 6 carbon atoms out of the above-described alkyl groups.

Specific examples of the triazine derivative represented by General Formula (2) above include melamine, acetoguanamine, benzoguanamine, acryloguanamine, 2,4-diamino-6-nonyl-1,3,5-triazine, 2,4-diamino-6-hydroxy-1,3,5-triazine, 2-amino-4,6-dihydroxy-1,3,5-triazine, 2,4-diamino-6-methoxy-1,3,5-triazine, 2,4-diamino-6-ethoxy-1,3,5-triazine, 2,4-diamino-6-propoxy-1,3,5-triazine, 2,4-diamino-6-isopropoxy-1,3,5-triazine, 2,4-diamino-6-mercapto-1,3,5-triazine, 2-amino-4,6-dimercapto-1,3,5-triazine, and the like.

As the component (A), it is preferable to use melamine (poly)phosphate or ammonium (poly)phosphate, out of the (poly)phosphate compounds represented by General Formula (1) above, from the viewpoint of flame retardancy, case of handling, and storage stability.

Examples of the melamine (poly)phosphate include melamine polyphosphates such as melamine orthophosphate and melamine pyrophosphate, and these melamine salts may be used alone or in a combination of two or more. Out of these, the melamine salt used as the component (A) of the present invention is preferably melamine pyrophosphate or melamine polyphosphate obtained by heating and condensing melamine orthophosphate, and more preferably a melamine salt in which, in the (poly)phosphate compound represented by General Formula (1) above, n is 2, p is 2, and $X^1$ is a triazine derivative represented by General Formula (2) above where $Z^1$ and $Z^2$ are —NH$_2$, that is, melamine pyrophosphate. If the melamine salt is a mixture of two or more types of substances, it is preferable that the mass-based content of melamine pyrophosphate is the highest in the mixture. Specifically, the content of melamine pyrophosphate in the mixture is preferably 90 mass % or more, and more preferably 93 mass % or more.

Examples of the ammonium (poly)phosphate include ammonium (poly)phosphate itself, and those obtained by performing various types of treatment on ammonium (poly) phosphate and composed mainly of ammonium (poly)phosphate (hereinafter, referred to as a compound composed mainly of ammonium (poly)phosphate). Examples of the ammonium (poly)phosphate itself include commercially available products such as Exolit-AP422 and Exolit-AP750 available from Clariant, Phos-chek-P/30 and Phos-chek-P/40 available from Monsanto, Sumisafe-P available from Sumitomo Chemical Company, Limited, and the like. The state of being composed mainly of ammonium (poly)phosphate means a state in which the amount of ammonium (poly)phosphate in the ammonium (poly)phosphate is 50 mass % or more, and preferably 70 mass % or more.

Next, the component (B) that is a composition of the present invention will be described.

A (poly)phosphate compound represented by General Formula (3) above used as the component (B) is a salt of (poly)phosphoric acid and diamine represented by $Y^1$. The diamine represented by $Y^1$ is diamine containing $R^3RN(CH_2)_mNR^5R^6$, piperazine, or a piperazine ring.

Examples of the linear or branched alkyl group having 1 to 5 carbon atoms represented by $R^3$, $R^4$, $R^5$ and $R^6$ include those with 1 to 5 carbon atoms, out of those mentioned above as specific examples of the alkyl group represented by $Z^1$ and $Z^2$. Examples of the diamine containing a piperazine ring include a compound in which one or more of atoms at positions 2, 3, 5, and 6 of piperazine are substituted with an alkyl group (preferably with 1 to 5 carbon atoms); and a compound in which amino groups at positions 1 and/or 4 of piperazine are substituted with an alkyl group (preferably with 1 to 5 carbon atoms) substituted with an amino group.

Examples of the diamine represented by $Y^1$ in General Formula (3) above include N,N,N',N'-tetramethyldiaminomethane, ethylenediamine, N,N'-dimethylethylenediamine, N,N'-diethylethylenediamine, N,N-dimethylethylenediamine, N,N-diethylethylenediamine, N,N,N',N'-tetramethylethylenediamine, 1,2-propanediamine, 1,3-propanediamine, tetramethylenediamine, pentamethylenediamine, hexamethylenediamine, 1,7-diaminoheptane, 1,8-diaminooctane, 1,9-diaminononane, 1,10-diaminodecane, piperazine, trans-2,5-dimethylpiperazine, 1,4-bis(2-aminoethyl)piperazine, 1,4-bis(3-aminopropyl) piperazine, and the like. Commercially available products may be used as all of these compounds.

As the component (B), it is preferable to use piperazine (poly)phosphate, out of the (poly)phosphate compounds represented by General Formula (3) above, from the viewpoint of flame retardancy, ease of handling, and storage stability.

Examples of the piperazine (poly)phosphate include piperazine polyphosphates such as piperazine orthophosphate and piperazine pyrophosphate, and these piperazine salts may be used alone or in a combination of two or more. Out of these, the piperazine salt used as the component (B) of the present invention is preferably piperazine pyrophosphate or piperazine polyphosphate obtained by heating and condensing piperazine orthophosphate, and more preferably a piperazine salt in which, in General Formula (3) above, r is 2, q is 1, and $Y^1$ is piperazine, that is, piperazine pyrophosphate. If piperazine (poly)phosphate is a mixture of substances, it is preferable that the mass-based content of piperazine pyrophosphate is the highest in the mixture.

Specifically, the content of piperazine pyrophosphate in the mixture is preferably 90 mass % or more, and more preferably 93 mass % or more.

From the viewpoint of obtaining higher flame retardancy, it is preferable that the composition of the present invention contains the components (A) and (B). If the composition of the present invention contains the components (A) and (B), the amount of component (A) in the composition is preferably from 10 to 50 parts by mass, and more preferably from 20 to 40 parts by mass, relative to 100 parts by mass of a total of the components (A) and (B). Furthermore, the amount of component (B) is preferably from 90 to 50 parts by mass, and more preferably from 80 to 60 parts by mass, relative to 100 parts by mass of a total of the components (A) and (B). It is preferable to set the amounts of component (A) and the amount of component (B) within the above-described ranges because, when the components (A) and (B) are combined with the component (C), which will be described later, the combustion suppressing effect (of suppressing maximum amount of generated heat), the gas barrier property, and the drip preventing effect of an intumescent layer formed during combustion are excellent. Furthermore, it is preferable to contain the component (A) and the component (B), because the flame retardant resin composition is excellent in terms of color tone.

Furthermore, the total amounts of components (A) and (B) in the composition of the present invention is preferably from 70 to 99.9 mass %, and more preferably from 80 to 99 mass %. The total amounts of components (A) and (B) is preferably 70 mass % or more from the viewpoint of improving the effect of imparting flame retardancy, and preferably 99.9 mass % or less from the viewpoint of ensuring the amount of component (C) and other optional components and enhancing the effects of the present invention.

The amounts of components (A) and (B) in the composition of the present invention can be measured using ion chromatography, ICP atomic emission spectroscopy, X-ray fluorescence analysis, nuclear magnetic resonance spectroscopy (NMR), or the like.

Next, the component (C) that is a composition of the present invention will be described.

The component (C) that is a composition of the present invention is a hydrous magnesium silicate.

A hydrous magnesium silicate may have various compositions, and its molecular formula and molecular weight cannot be specified. A hydrous magnesium silicate is a mineral represented by the general formula $xMgO \cdot ySiO_2 \cdot nH_2O$, and examples thereof include talc and sepiolite. Out of these, it is particularly preferable to use sepiolite, which is a fibrous clay material, from the viewpoint of heat release suppression, drip prevention, and smoke reduction during combustion. Sepiolite is typically represented by the composition formula $Mg_8Si_{12}O_{30}(OH_2)_4(OH)_4 \cdot 6\text{-}8H_2O$, but its structure cannot be unambiguously specified. There is no limitation on the form of sepiolite, but, for example, as stated by L. Bokobza et al., Polymer International, 53, 1060-1065 (2004), sepiolite may be a layered fibrous material in which the fibers stick to each other to form fiber bundles and the fiber bundles form an aggregate. Such an aggregate can be cracked through industrial treatment such as pulverization or chemical modification (European Patent No. 170,299, for example) or the like, and, accordingly, fibrous sepiolite with a diameter on the nanometer scale can be obtained. Sepiolite may not be subjected to surface treatment (unmodified sepiolite), or may be subjected to surface treatment (organic modified sepiolite). If surface treatment is performed, for example, sepiolite can be modified using a quaternary ammonium salt or organic silane. From the viewpoint of flame retardancy and powder properties, it is particularly preferable to perform surface treatment using organic silane. Examples of the commercially available products of organic silane sepiolite include unmodified sepiolite PANGEL HV (available from Kusumoto Chemicals, Ltd.), and organic modified sepiolite PANGEL B20 (available from Kusumoto Chemicals, Ltd.), PANGEL B40 (available from Kusumoto Chemicals, Ltd.), Milcon E (available from Showa KDE Co., Ltd.), Aidplus (available from Sepio Japan), Adins Clay 80T (Tolsa Group), Adins Clay SS2 20 (Tolsa Group), and the like. Examples of the organic modified sepiolite modified using organic silane include Adins Clay 80T (Tolsa Group) and the like. The component (C) may be used alone or in a combination of two or more.

In the composition of the present invention, the amount of component (C) is preferably from 0.1 to 50 parts by mass relative to 100 parts by mass of a total of the components (A) and (B). From the viewpoint of heat release amount suppression during combustion, processability, smoke reduction, and drip suppression, the amount of component (C) is preferably from 0.5 to 40 parts by mass, and more preferably from 1 to 40 parts by mass. It is advantageous to set the amount of component (C) to 0.1 parts by mass or more from the viewpoint of drip prevention, heat release amount suppression during combustion, an intumescent layer forming effect, and smoke reduction. On the other hand, from the viewpoint of heat release amount suppression during combustion, prevention of processing machine contamination during processing, and economic effects, it is advantageous to set the amount of component (C) to 50 parts by mass or less. In the present invention, the amount of component (C) can be measured using a dry particle counter, a wet particle counter, infrared spectroscopy, X-ray fluorescence analysis, or the like. Furthermore, the shape thereof can be measured, for example, using a scanning electron microscope, a transmission electron microscope, or the like.

Moreover, it is preferable that the composition of the present invention further contains zinc oxide (ZnO) as a component (D). Zinc oxide functions as a flame retardant aid. Zinc oxide may be surface treated. Commercially available products of zinc oxide can be used. Examples of the commercially available products of zinc oxide include zinc oxide class 1 (available from Mitsui Mining & Smelting Co., Ltd.), partially coated zinc oxide (available from Mitsui Mining & Smelting Co., Ltd.), Nano Fine 50 (super-fine zinc oxide particles with an average particle size of 0.02 μm available from Sakai Chemical Industry Co., Ltd.), Nano Fine K (super-fine zinc oxide particles coated by zinc silicate with an average particle size of 0.02 μm available from Sakai Chemical Industry Co., Ltd.), and the like.

From the viewpoint of flame retardancy, in the composition according to the present invention, the amount of zinc oxide that is the component (D) is preferably from 0.01 to 10 parts by mass, more preferably from 0.5 to 8 parts by mass, and even more preferably from 1 to 5 parts by mass, relative to 100 parts by mass of a total of the components (A) and (B). By setting the amount of zinc oxide to 0.01 parts by mass or more, flame retardancy is further improved. On the other hand, by setting the amount of zinc oxide to 10 parts by mass or less, processability is unlikely to be negatively affected. In the present invention, the amount of component (D) can be measured using ICP atomic emission spectroscopy, X-ray fluorescence analysis, or the like.

The composition according to the present invention preferably further contains at least one selected from silicone oil, an epoxy-based coupling agent, and a lubricant as a component (E), from the viewpoint of preventing aggregation of flame retardant agent powder, as well as improving storage stability, dispersibility to synthetic resin, and flame retardancy.

Examples of silicone oil include: dimethyl silicone oil in which all side chains and terminals of polysiloxane are methyl groups; methyl phenyl silicone oil in which side chains and terminals of polysiloxane are methyl groups and some of the side chains are phenyl groups; methyl hydrogen silicone oil in which side chains and terminals of polysiloxane are methyl groups and some of the side chains are hydrogen; and copolymers thereof. It is also possible to use modified silicone oil modified by introducing an organic group to some of the side chains and/or the terminals of silicone oil. Examples thereof include amine-modified silicone oil, epoxy-modified silicone oil, alicyclic epoxy-modified silicone oil, carboxyl-modified silicone oil, carbinol-modified silicone oil, mercapto-modified silicone oil, polyether-modified silicone oil, long-chain alkyl-modified silicone oil, fluoroalkyl-modified silicone oil, higher-fatty acid ester-modified silicone oil, higher-fatty acid amide-modified silicone oil, silanol-modified silicone oil, diol-modified silicone oil, phenol-modified silicone oil, and/or aralkyl-modified silicone oil.

Specific examples of silicone oil are as follows. As dimethyl silicone oil, examples include KF-96 (available from Shin-Etsu Chemical Co., Ltd.), KF-965 (available from Shin-Etsu Chemical Co., Ltd.), KF-968 (available from Shin-Etsu Chemical Co., Ltd.), and the like. As methyl hydrogen silicone oil, examples include KF-99 (available from Shin-Etsu Chemical Co., Ltd.), KF-9901 (available from Shin-Etsu Chemical Co., Ltd.), HMS-151 (available from Gelest Inc.), HMS-071 (available from Gelest Inc.), HMS-301 (available from Gelest Inc.), DMS-H21 (available from Gelest Inc.), and the like. Examples of methyl phenyl silicone oil include KF-50 (available from Shin-Etsu Chemical Co., Ltd.), KF-53 (available from Shin-Etsu Chemical Co., Ltd.), KF-54 (available from Shin-Etsu Chemical Co., Ltd.), KF-56 (available from Shin-Etsu Chemical Co., Ltd.), and the like. Examples of epoxy-modified products include X-22-343 (available from Shin-Etsu Chemical Co., Ltd.), X-22-2000 (available from Shin-Etsu Chemical Co., Ltd.), KF-101 (available from Shin-Etsu Chemical Co., Ltd.), KF-102 (available from Shin-Etsu Chemical Co., Ltd.), and KF-1001 (available from Shin-Etsu Chemical Co., Ltd.). Examples of carboxyl-modified products include X-22-3701E (available from Shin-Etsu Chemical Co., Ltd.). Examples of carbinol-modified products include X-22-4039 (available from Shin-Etsu Chemical Co., Ltd.), and X-22-4015 (available from Shin-Etsu Chemical Co., Ltd.). Examples of amine-modified products include KF-393 (available from Shin-Etsu Chemical Co., Ltd.), and the like.

In the composition according to the present invention, from the viewpoint of preventing aggregation of flame retardant agent powder, as well as improving storage stability and dispersibility to synthetic resin, out of the silicone oils, it is preferable to use methyl hydrogen silicone oil.

The epoxy-based coupling agent functions to prevent aggregation of flame retardant agent powder, improve storage stability, and impart water resistance and heat resistance. As the epoxy-based coupling agent, a compound that is represented by, for example, the general formula: $A-(CH_2)_k-Si(OR)_3$. In the formula, A represents an epoxy group, k is a number of 1 to 3, and R represents a methyl group or an ethyl group. The epoxy group represented by A may be a glycidoxy group or a 3,4-epoxycyclohexyl group.

Specific examples of the epoxy-based coupling agent include, as silane coupling agents that have an epoxy group, 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane, glycidoxyoctyltrimethoxysilane, and the like.

Examples of lubricants include: pure hydrocarbon-based lubricants such as liquid paraffin, natural paraffin, micro wax, synthetic paraffin, low molecular weight polyethylene, and polyethylene wax; halogenated hydrocarbon-based lubricants; fatty acid-based lubricants such as a higher fatty acid and a hydroxy fatty acid; fatty acid amide-based lubricants such as a fatty acid amide and a bis-fatty acid amide; ester-based lubricants including lower alcohol esters of fatty acids, polyalcohol esters of fatty acids such as glyceride, polyglycol esters of fatty acids, and fatty alcohol esters of fatty acids (ester wax); metallic soap, fatty alcohols, polyalcohols, polyglycols, polyglycerols, partial ester-based lubricants such as partial esters of fatty acids and polyalcohols, partial esters of fatty acids, polyglycols and polyglycerols, silicone oil, mineral oil, and the like. These lubricants can be used alone or in a combination of two or more.

In the case where the composition according to the present invention further contains at least one selected from silicone oil, an epoxy-based coupling agent, and a lubricant as a component (E), from the viewpoint of improving flame retardancy, the amount of component (E) in the composition according to the present invention is preferably from 0.01 to 5 parts by mass, and more preferably from 0.01 to 3 parts by mass, relative to 100 parts by mass of a total of the components (A) and (B), from the viewpoint of effectively exhibiting the effect produced by inclusion of the component (E). In the present invention, the amount of component (E) can be measured using gas chromatography, gas chromatography-mass spectrometry, or the like.

In particular, in the case where silicone oil is contained, the amount of silicone oil is preferably from 0.01 to 3 parts by mass, and more preferably from 0.1 to 1 part by mass, relative to 100 parts by mass of a total of the components (A) and (B), from the viewpoint of enhancing the above-described effect produced by the inclusion of silicone oil.

In particular, in the case where an epoxy-based coupling agent is contained in the composition according to the present invention, the amount of epoxy-based coupling agent is preferably from 0.01 to 3 parts by mass, and more preferably from 0.1 to 1 part by mass, relative to 100 parts by mass of a total of the components (A) and (B), from the viewpoint of enhancing the above-described effect produced by the inclusion of the epoxy-based coupling agent.

In the case where a lubricant is contained in the composition according to the present invention, the amount of lubricant is preferably from 0.01 to 3 parts by mass, and more preferably from 0.1 to 0.5 parts by mass, relative to 100 parts by mass of a total of the components (A) and (B), from the viewpoint of enhancing the above-described effect produced by including the lubricant.

The composition used in the present invention may optionally contain a phenol-based antioxidizing agent, a phosphite-based antioxidizing agent, a thioether-based antioxidizing agent, other antioxidizing agents, a nucleating agent, an ultraviolet absorbing agent, a light stabilizing agent, a plasticizing agent, a filler, a fatty acid metal salt, an antistatic agent, a pigment, a dye, and the like. These components may be blended with the composition according to the present invention in advance, or may be blended with a synthetic resin when the synthetic resin is blended. It is preferable to blend these components because the synthetic resin is stabilized.

Examples of the phenol-based antioxidizing agent include 2,6-di-tert-butyl-4-methylphenol, 2,6-di-tert-butyl-4-ethylphenol, 2-tert-butyl-4,6-dimethylphenol, styrenated phenol, 2,2'-methylenebis(4-ethyl-6-tert-butylphenol), 2,2'-thiobis-(6-tert-butyl-4-methylphenol), 2,2'-thiodiethylenebis[3-(3,5-di-tert-butyl-4-hydroxyphenyl)propionate], 2-methyl-4,6-bis(octylsulfanylmethyl)phenol, 2,2'-isobutylidenebis(4,6-dimethylphenol), isooctyl-3-(3,5-di-tert-butyl-4-hydroxyphenyl)propionate, N,N'-hexane-1,6-diylbis[3-(3,5-di-tert-butyl-4-hydroxyphenyl)propionamide, 2,2'-oxamide-bis[ethyl-3-(3,5-di-tert-butyl-4-hydroxyphenyl)propionate], 2-ethylhexyl-3-(3',5'-di-tert-butyl-4'-hydroxyphenyl)propionate, 2,2'-ethylenebis(4,6-di-tert-butylphenol), 3,5-di-tert-butyl-4-hydroxybenzenepropionic acid and $C_{13-15}$ alkyl esters, 2,5-di-tert-amyhydroquinone, hindered phenol polymer (product name AO.OH.98 available from Adeka Palmarole Sas), 2,2'-methylenebis[6-(1-methylcyclohexyl)-p-cresol], 2-tert-butyl-6-(3-tert-butyl-2-hydroxy-5-methylbenzyl)-4-methylphenylacrylate, 2-[1-(2-hydroxy-3,5-di-tert-pentyl phenyl)ethyl]-4,6-di-tert-pentyl phenylacrylate, 6-[3-(3-tert-butyl-4-hydroxy-5-methyl)propoxy]-2,4,8,10-tetra-tert-butylbenz[d,f][1,3,2]-dioxaphosphobin, hexamethylenebis[3-(3,5-di-tert-butyl-4-hydroxyphenyl)propionate, bis[monoethyl(3,5-di-tert-butyl-4-hydroxybenzyl)phosphonate] calcium salt, a reaction product of 5,7-bis(1,1-dimethylethyl)-3-hydroxy-2 (3H)-benzofuranone and o-xylene, 2,6-di-tert-butyl-4-(4,6-bis(octylthio)-1,3,5-triazine-2-ylamino)phenol, DL-a-tocopherol (vitamin E), 2,6-bis(α-methylbenzyl)-4-methylphenol, bis[3,3-bis-(4'-hydroxy-3'-tert-butyl-phenyl) butanoic acid]glycol ester, 2,6-di-tert-butyl-p-cresol, 2,6-diphenyl-4-octadecyloxy phenol, stearyl(3,5-di-tert-butyl-4-hydroxyphenyl)propionate, distearyl(3,5-di-tert-butyl-4-hydroxybenzyl)phosphonate, tridecyl-3,5-tert-butyl-4-hydroxybenzylthioacetate, thiodiethylenebis[(3,5-di-tert-butyl-4-hydroxyphenyl)propionate], 4,4'-thiobis(6-tert-butyl-m-cresol), 2-octylthio-4,6-di(3,5-di-tert-butyl-4-hydroxyphenoxy)-s-triazine, 2,2'-methylenebis(4-methyl-6-tert-butylphenol), bis[3,3-bis(4-hydroxy-3-tert-butyl phenyl)butyric acid]glycol ester, 4,4'-butylidenebis(2,6-di-tert-butylphenol), 4,4'-butylidenebis(6-tert-butyl-3-methylphenol), 2,2'-ethylidenebis(4,6-di-tert-butylphenol), 1,1,3-tris(2-methyl-4-hydroxy-5-tert-butyl phenyl) butane, bis[2-tert-butyl-4-methyl-6-(2-hydroxy-3-tert-butyl-5-methylbenzyl)phenyl] terephthalate, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl]isocyanurate, tetrakis[methylene-3-(3',5'-di-tert-butyl-4'-hydroxyphenyl)propionate] methane, 2-tert-butyl-4-methyl-6-(2-acryloyloxy-3-tert-butyl-5-methylbenzyl)phenol, 3,9-bis[2-[3-(3-tert-butyl-4-hydroxy-5-methylphenyl)propanoyloxy]-1,1-dimethylethyl]-2,4,8,10-tetraoxaspiro[5.5]undecane, triethylene glycol bis[3-tert-4-hydroxy-5-methylphenyl)propionate], stearyl-3-(3,5-di-tert-butyl-4-hydroxyphenyl)propionic acid amide, palmityl-3-(3,5-di-tert-butyl-4-hydroxyphenyl)propionic acid amide, myristyl-3-(3,5-di-tert-butyl-4-hydroxyphenyl)propionic acid amide, lauryl-3-(3,5-di-tert-butyl-4-hydroxyphenyl)propionic acid amide, other 3-(3,5-dialkyl-4-hydroxyphenyl)propionic acid derivatives, and the like. These phenol-based antioxidizing agents may be used alone or in a combination of two or more. The amount of phenol-based antioxidizing agent used when blended with a resin is preferably from 0.001 to 5 parts by mass, and more preferably from 0.01 to 1.0 part by mass relative to 100 parts by mass of the flame retardant resin composition.

Examples of the phosphite-based antioxidizing agent include triphenyl phosphite, diisooctyl phosphite, heptakis (dipropylene glycol)triphosphite, tri-isodecyl phosphite, diphenylisooctyl phosphite, diisooctyl phenyl phosphite, diphenyl tridecyl phosphite, triisooctyl phosphite, trilauryl phosphite, diphenylphosphite, tris(dipropylene glycol)phosphite, di-isodecyl pentaerythritol diphosphite, dioleoyl hydrogen phosphite, trilauryltrithio phosphite, bis(tridecyl) phosphite, tris(isodecyl)phosphite, tris(tridecyl)phosphite, diphenyl decyl phosphite, dinonyl phenylbis(nonylphenyl) phosphite, poly(dipropylene glycol)phenylphosphite, tetraphenyldipropylene glycol diphosphite, tris nonylphenyl phosphite, tris(2,4-di-tert-butylphenyl)phosphite, tris(2,4-di-tert-butyl-5-methylphenyl)phosphite, tris[2-tert-butyl-4-(3-tert-butyl-4-hydroxy-5-methylphenylthio)-5-methylphenyl]phosphite, tri(decyl)phosphite, octyldiphenylphosphite, di(decyl)monophenylphosphite, distearylpentaerythritol diphosphite, a mixture of distearylpentaerythritol and stearic acid calcium salt, alkyl (C10) bisphenol A phosphite, di(tridecyl)pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetraphenyl-tetra(tridecyl)pentaerythritol tetraphosphite, bis(2,4-di-tert-butyl-6-methylphenyl)ethylphosphite, tetra(tridecyl) isopropylidene diphenol diphosphite, tetra(tridecyl)-4,4'-n-butylidenebis(2-tert-butyl-5-methylphenol)diphosphite, hexa(tridecyl)-1,1,3-tris(2-methyl-4-hydroxy-5-tert-butylphenyl)butane triphosphite, tetrakis(2,4-di-tert-butyl phenyl)biphenylene diphosphonite, 9,10-dihydro-9-oxa-10-phosphaphenanthrene-10-oxide, (1-methyl-1-propenyl-3-ylidene)tris(1,1-dimethylethyl)-5-methyl-4,1-phenylene) hexatridecylphosphite, 2,2'-methylenebis(4,6-di-tert-butylphenyl)-2-ethylhexylphosphite, 2,2'-methylenebis(4,6-di-tert-butylphenyl)-octadecylphosphite, 2,2'-ethylidenebis (4,6-di-tert-butylphenyl)fluorophosphite, 4,4'-butylidenebis (3-methyl-6-tert-butylphenylditridecyl)phosphite, tris(2-[(2,4,8,10-tetrakis-tert-butyldibenzo[d,f][1,3,2] dioxaphosphepin-6-yl)oxy]ethyl)amine, 3,9-bis(4-nonylphenoxy)-2,4,8,10-tetraoxa-3,9-diphosphesspiro[5,5] undecane, 2,4,6-tri-tert-butyl phenyl-2-butyl-2-ethyl-1,3-propanediol phosphite, 4,4'-isopropylidene diphenol $C_{12-15}$ alcohol phosphite, 3,9-bis(2,6-di-tert-butyl-4-methylphenyl)-3,9-bis-diphospha-2,4,8,10-tetraoxa-3,9-diphosphesspiro[5,5]undecane, diphenyl(isodecyl)phosphite, biphenyl diphenyl phosphite, and the like. These phosphite-based antioxidizing agents can be used alone or in a combination of two or more. The amount of phosphite-based antioxidizing agent used when blended with a resin is preferably from 0.001 to 5 parts by mass, and more preferably from 0.01 to 1.0 part by mass relative to 100 parts by mass of the flame retardant resin composition.

Examples of the thioether-based antioxidizing agent include 3,3'-thiodipropionic acid, alkyl ($C_{12-14}$) thiopropionic acid, di(lauryl)-3,3'-thiodipropionate, 3,3'-thiobis propinoic acid ditridecyl, di(myristyl)-3,3'-thiodipropionate, di(stearyl)-3,3'-thiodipropionate, di(octadecyl)-3,3'-thiodipropionate, lauryl stearylthiodipropionate, tetrakis[methylene-3-(dodecylthio)propionate]methane, thiobis(2-tert-butyl-5-methyl-4,1-phenylene)bis(3-(dodecylthio) propionate), 2,2'-thiodiethylenebis(3-aminobutenoate), 4,6-bis(octylthiomethyl)-o-cresol, 2,2'-thiodiethylenebis[3-(3,5-di-tert-butyl-4-hydroxyphenyl)propionate], 2,2'-thiobis(4-methyl-6-tert-butylphenol), 2,2'-thiobis(6-tert-butyl-p-cresol), 2-ethylhexyl-(3,5-di-tert-butyl-4-hydroxybenzyl) thioacetate, 4,4'-thiobis(6-tert-butyl-3-methylphenol), 4,4'-thiobis(4-methyl-6-tert-butylphenol), 4,4'-[thiobis (methylene)]bis(2-tert-butyl-6-methyl-1-hydroxybenzyl), bis(4,6-di-tert-butylphenol-2-yl)sulfide, tridecyl-3,5-di-tert-butyl-4-hydroxybenzylthioacetate, 1,4-bis(octylthiomethyl)-6-methylphenol, 2,4-bis(dodecylthiomethyl)-6-methylphenol, disteary-disulfide, bis(methyl-4-[3-n-alkyl ($C_{12}$/$C_{14}$) thiopropionyloxy]5-tert-butyl phenyl)sulfide, and the like. These thioether-based antioxidizing agents can be used alone or in a combination of two or more. The amount of thioether-based antioxidizing agent used when blended with a resin is preferably from 0.001 to 5 parts by mass, and more preferably from 0.01 to 1.0 part by mass relative to 100 parts by mass of the flame retardant resin composition.

Examples of the other antioxidizing agents include N-benzyl-α-phenyl nitrone, N-ethyl-α-methyl nitrone, N-octyl-α-heptyl nitrone, N-lauryl-α-undecyl nitrone, N-tetradecyl-α-tridecyl nitrone, N-hexadecyl-α-pentadecyl nitrone, N-octyl-α-heptadecyl nitrone, N-hexadecyl-α-heptadecyl nitrone, N-octadecyl-α-pentadecyl nitrone, N-heptadecyl-α-heptadecyl nitrone, N-octadecyl-α-heptadecyl nitrone, and other nitrone compounds, 3-arylbenzofuran-2 (3H)-one, 3-(alkoxyphenyl)benzofuran-2-one, 3-(acyloxyphenyl)benzofuran-2(3H)-one, 5,7-di-tert-butyl-3-(3,4-dimethylphenyl)-benzofuran-2(3H)-one, 5,7-di-tert-butyl-3-(4-hydroxyphenyl)-benzofuran-2(3H)-one, 5,7-di-tert-butyl-3-{4-(2-hydroxyethoxy)phenyl}-benzofuran-2(3H)-one, 6-(2-(4-(5,7-di-tert-2-oxo-2,3-dihydrobenzofuran-3-yl)phenoxy) ethoxy)-6-oxohexyl-6-((6-hydroxyhexanoyl)oxy) hexanoate, 5-di-tert-butyl-3-(4-((15-hydroxy-3,6,9,13-tetraoxapentadecyl)oxy)phenyl)benzofuran-2(3H)one, and other benzofuran compounds, and the like. These other antioxidizing agents can be used alone or in a combination of two or more. The amount of other antioxidizing agents used when blended with a resin is preferably from 0.001 to 5 parts by mass, and more preferably from 0.01 to 1.0 part by mass relative to 100 parts by mass of the flame retardant resin composition.

Examples of the nucleating agent include sodium benzoate, 4-tert-butylbenzoic acid aluminum salt, sodium adipate, 2-sodiumbicyclo[2.2.1]heptane-2,3-dicarboxylate, and other carboxylic acid metal salts, sodium bis(4-tert-butylphenyl) phosphate, sodium-2,2'-methylenebis(4,6-di-tert-butylphenyl)phosphate, lithium-2,2'-methylenebis(4,6-di-tert-butylphenyl)phosphate, and other phosphoric acid ester metal salts, dibenzylidene sorbitol, bis(methylbenzylidene) sorbitol, bis(3,4-dimethylbenzylidene)sorbitol, bis(p-ethylbenzylidene)sorbitol, bis(dimethylbenzylidene)sorbitol, 1,2, 3-trideoxy-4,6:5,7-bis-O-((4-propylphenyl)methylene)-nonitol, 1,3:2,4-bis(p-methylbenzylidene)sorbitol, 1,3:2,4-bis-O-benzylidene-D-glucitol (dibenzylidene sorbitol), and other polyalcohol derivatives, N,N',N"-tris[2-methylcyclohexyl]-1,2,3-propanetricarboxamide, N,N',N"-tricyclohexyl-1,3,5-benzenetricarboxamide, N,N'-dicyclohexyl-naphthalene dicarboxamide, 1,3,5-tri(dimethyl isopropoyl amino)benzene, and other amide compounds, and the like. These nucleating agents can be used alone or in a combination of two or more. The amount of nucleating agent used when blended with a resin is preferably from 0.001 to 5 parts by mass, and more preferably from 0.01 to 1.0 part by mass relative to 100 parts by mass of the flame retardant resin composition.

Examples of the ultraviolet absorbing agent include 2,4-dihydroxy benzophenon, 5,5'-methylenebis(2-hydroxy-4-methoxybenzophenon), 2-hydroxy-4-n-octoxybenzophenon, 2-hydroxy-4-methoxybenzophenon, 2-hydroxy-4-dodecyloxybenzophenon, 2,2'-dihydroxy-4-methoxybenzophenone, and other benzophenone-based ultraviolet absorbing agents, 2-(2-hydroxy-5-methylphenyl) benzotriazole, 2-(2-hydroxy-5-tert-octylphenyl)benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylenebis(4-tert-octyl-6-benzotriazolylphenol), 2-(2-hydroxy-3-tert-butyl-5-carboxyphenyl)benzotriazole, and other polyethylene glycol esters, 2-[2-hydroxy-3-(2-acryloyloxyethyl)-5-methylphenyl]benzotriazole, 2-[2-hydroxy-3-(2-methacryloyloxyethyl)-5-tert-butylphenyl]benzotriazole, 2-[2-hydroxy-3-(2-methacryloyloxyethyl)-5-tert-octylphenyl]benzotriazole, 2-[2-hydroxy-3-(2-methacryloyloxyethyl)-5-tert-butyl phenyl]-5-chlorobenzotriazole, 2-[2-hydroxy-5-(2-methacryloyloxyethyl)phenyl]benzotriazole, 2-[2-hydroxy-3-tert-butyl-5-(2-methacryloyloxyethyl)phenyl]benzotriazole, 2-[2-hydroxy-3-tert-amyl-5-(2-methacryloyloxyethyl)phenyl]benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl]benzotriazole, 2-[2-hydroxy-4-(3-methacryloyloxypropyl)phenyl]benzotriazole, and other benzotriazole-based ultraviolet absorbing agents, phenyl salicylate, resorcinol monobenzoate, 2,4-di-tert-butylphenyl-3,5-di-tert-butyl-4-hydroxybenzoate, octyl(3,5-di-tert-butyl-4-hydroxy)benzoate, dodecyl(3,5-di-tert-butyl-4-hydroxy)benzoate, tetradecyl(3,5-di-tert-butyl-4-hydroxy)benzoate, hexadecyl(3,5-di-tert-butyl-4-hydroxy)benzoate, octadecyl(3,5-di-tert-butyl-4-hydroxy)benzoate, behenyl(3,5-di-tert-butyl-4-hydroxy)benzoate, and other benzoate-based ultraviolet absorbing agents, 2-ethyl-2'-ethoxy oxalanilide, 2-ethoxy-4'-dodecyl oxalanilide, 2-ethyl-2'-ethoxy-5'-tert-butyl-oxalanilide, and other substituted-oxalanilide-based ultraviolet absorbing agents, ethyl-α-cyano-β,β-diphenylacrylate, methyl-2-cyano-3-methyl-3-(p-methoxyphenyl)acrylate, tetrakis(α-cyano-β,β-diphenylacryloyloxymethyl)methane, and other cyanoacrylate-based ultraviolet absorbing agents, 2-(2-hydroxy-4-(2-(2-ethylhexanoyloxy)ethyloxy)-4,6-diphenyl-1,3,5-triazine, 2,4,6-tris(2-hydroxy-4-hexyloxy-3-methylphenyl)-1,3,5-triazine, 2-(2-hydroxy-4-octylfoxy-phenyl)-4,6-bis(2,4-dimethylphenyl)-1,3,5-triazine, 2-(4,6-diphenyl-1,3,5-triazine-2-yl)-5-hexyloxyphenol, 2-(4,6-di(1,1'-biphenyl)-4-yl)-1,3,5-triazine-2-yl)-5-(2-ethylhexyloxy)phenol, and other triazine-based ultraviolet absorbing agents. These ultraviolet absorbing agents can be used alone or in a combination of two or more. The amount of ultraviolet absorbing agent used when blended with a resin is preferably from 0.001 to 5 parts by mass, and more preferably from 0.05 to 0.5 parts by mass relative to 100 parts by mass of the flame retardant resin composition.

Examples of the light stabilizing agent include 2,2,6,6-tetramethyl-4-piperidylstearate, 1,2,2,6,6-pentamethyl-4-piperidylstearate, 2,2,6,6-tetramethyl-4-piperidylbenzoate, bis (2,2,6,6-tetramethyl-4-piperidyl)sebacate, tetrakis(2,2,6,6-tetramethyl-4-piperidyl)-1,2,3,4-butane tetracarboxylate, tetrakis(1,2,2,6,6-pentamethyl-4-piperidyl)-1,2,3,4-butane tetracarboxylate, bis(2,2,6,6-tetramethyl-4-piperidyl)di(tridecyl)-1,2,3,4-butane tetracarboxylate, bis(1,2,2,6,6-pentamethyl-4-piperidyl)-di(tridecyl)-1,2,3,4-butane tetracarboxylate, bis(1,2,2,4,4-pentamethyl-4-piperidyl)-2-butyl-2-(3,5-di-tert-butyl-4-hydroxybenzyl)malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazine-6-yl]-1,5,8,12-4-azadodecane, 1,5,8,12-tetrakis[2,4-bis(N-butyl-N-(1,2,2,6,6-pentamethyl-4-piperidyl)amino)-s-triazine-6-yl]-1,5,8,12-4-azadodecane, 1,6,11-tris[2,4-bis(N-butyl-N-(2,2,6,6-tetramethyl-4-piperidyl)amino)-s-triazine-6-yl]amino undecane, 1,6,11-tris[2,4-bis(N-butyl-N-(1,2,2,6,6-pentamethyl-4-piperidyl)amino)-s-triazine-6-yl]amino undecane, bis{4-(1-octyloxy-2,2,6,6-tetramethyl) piperidyl}decanedionate, bis{4-(2,2,6,6-tetramethyl-1-undecyloxy)piperidyl}carbonate, TINUVINNOR 371 available from Ciba Specialty Chemicals, 2,2,6,6-tetramethyl-4-piperidylmethacrylate, 1,2,3,4-butanetetracarboxylic acid, a polymer of 2,2-bis(hydroxymethyl)-1,3-propanediol and 3-hydroxy-2,2-dimethylpropanol, 1,2,2,6,6-pentamethyl-4-piperidinyl ester, 1,3-bis(2,2,6,6-tetramethylpiperidine-4-yl) 2,4-ditridecylbenzene-1,2,3,4,tetracarboxylate, bis(1-octyloxy-2,2,6,6-pentamethyl-4-piperidyl) sebacate, poly[[6-[(1,1,3,3-tetramethylbutyl)amino]-1,3,5-triazine-2,4-diyl]][(2,2,6,6-tetramethyl-4-piperidinyl)imino]-1,6-hexanediyl[(2,2,6,6-tetramethyl-4-piperidinyl)imino]]), and the like. These light stabilizing agents can be used alone or in a combination of two or more. The amount of light stabilizing agent used when blended with a resin is preferably from 0.001 to 5 parts by mass, and more preferably from 0.005 to 0.5 parts by mass relative to 100 parts by mass of the flame retardant resin composition.

Examples of the plasticizing agent include epoxidized soybean oil, epoxidized linseed oil, an epoxidized fatty acid octyl ester, and other epoxy-based plasticizing agents, methacrylate-based plasticizing agents, a polycondensate of dicarboxylic acid and polyalcohol, a polycondensate of polyvalent carboxylic acid and polyalcohol, and other polyester-based plasticizing agents, a polycondensate of dicarboxylic acid, polyalcohol and alkylene glycol, a polycondensate of dicarboxylic acid, polyalcohol and arylene glycol, a polycondensate of a polyvalent carboxylic acid, polyalcohol and alkylene glycol, a polycondensate of a polyvalent carboxylic acid, polyalcohol and arylene glycol, and other polyether ester-based plasticizing agents, an adipic acid ester, a succinic acid ester, and other fatty acid ester-based plasticizing agents, a phthalic acid ester, a terephthalic acid ester, a trimellitic acid ester, a pyromellitic acid ester, a benzoic acid ester, and other aromatic ester-based plasticizing agents, and the like. These plasticizing agents can be used alone or in a combination of two or more. The amount of plasticizing agent used when blended with a resin is preferably from 0.1 to 500 parts by mass, and more preferably from 1 to 100 parts by mass relative to 100 parts by mass of the flame retardant resin composition.

Examples of the filler include mica, calcium carbonate, calcium oxide, calcium hydroxide, magnesium carbonate, magnesium hydroxide, magnesium oxide, magnesium sulfate, aluminum hydroxide, barium sulfate, glass powder, glass fiber, alumina, potassium titanate whisker, wollastonite, fibrous magnesium oxysulfate, and the like. The particle size (fiber diameter or fiber length and aspect ratio in the case where the filler is fibrous) may be selected as appropriate. These fillers can be used alone or in a combination of two or more. The amount of filler used when blended with a resin is preferably from 1 to 100 parts by mass, and more preferably from 3 to 80 parts by mass relative to 100 parts by mass of the flame retardant resin composition.

Examples of fatty acids in the fatty acid metal salt include capric acid, 2-ethylhexanoic acid, undecylic acid, lauric acid, tridecylic acid, myristic acid, pentadecylic acid, palmitic acid, margaric acid, stearic acid, nonadecylic acid, arachidic acid, heneicosylic acid, behenic acid, tricosylic acid, lignoceric acid, cerotic acid, montanic acid, melissic acid, and other saturated fatty acids, 4-decenoic acid, 4-dodecenoic acid, palmitoleic acid, α-linolenic acid, linoleic acid, γ-linolenic acid, stearidonic acid, petroselinic acid, oleic acid, elaidic acid, vaccenic acid, eicosapentaenoic acid, docosapentaenoic acid, docosahexaenoic acid, and other linear unsaturated fatty acids, trimesic acid, and other aromatic fatty acids. In particular, it is preferable to use a saturated fatty acid such as myristic acid, stearic acid, or 12-hydroxystearic acid. Examples of metals in the fatty acid metal salt include alkali metal, magnesium, calcium, strontium, barium, titanium, manganese, iron, zinc, silicon, zirconium, yttrium, barium, hafnium, and the like. In particular, it is preferable to use alkali metals such as sodium, lithium, and potassium. These fatty acid metal salts can be used alone or in a combination of two or more. The amount of fatty acid metal salt used when blended with a resin is preferably from 0.001 to 5 parts by mass, and more preferably from 0.05 to 3 parts by mass relative to 100 parts by mass of the flame retardant resin composition.

Examples of the antistatic agent include: cationic antistatic agents such as a fatty acid quaternary ammonium ion salt and a polyamine quaternary salt; anionic antistatic agents such as a higher alcohol phosphoric acid ester salt, a higher alcohol EO adduct, a polyethylene glycol fatty acid ester, an anionic alkyl sulfonic acid salt, a higher alcohol sulfuric acid ester salt, a higher alcohol ethylene oxide adduct sulfuric acid ester salt, and a higher alcohol ethylene oxide adduct phosphoric acid ester salt; nonionic antistatic agents such as a polyalcohol fatty acid ester, a polyglycol-phosphoric acid ester, and polyoxyethylene alkyl allyl ether; amphoteric alkyl betaines such as an alkyl dimethyl aminoacetic acid betaine; and amphoteric antistatic agents such as an imidazoline-type amphoteric active agent. These antistatic agents can be used alone or in a combination of two or more. The amount of antistatic agent used when blended with a resin is preferably from 0.01 to 20 parts by mass, and more preferably from 3 to 10 parts by mass relative to 100 parts by mass of the flame retardant resin composition.

As the pigment, a commercially available pigment can be used. Examples of the pigment include: Pigment Red 1, 2, 3, 9, 10, 17, 22, 23, 31, 38, 41, 48, 49, 88, 90, 97, 112, 119, 122, 123, 144, 149, 166, 168, 169, 170, 171, 177, 179, 180, 184, 185, 192, 200, 202, 209, 215, 216, 217, 220, 223, 224, 226, 227, 228, 240, and 254; Pigment Orange 13, 31, 34, 36, 38, 43, 46, 48, 49, 51, 52, 55, 59, 60, 61, 62, 64, 65, and 71; Pigment Yellow 1, 3, 12, 13, 14, 16, 17, 20, 24, 55, 60, 73, 81, 83, 86, 93, 95, 97, 98, 100, 109, 110, 113, 114, 117, 120, 125, 126, 127, 129, 137, 138, 139, 147, 148, 150, 151, 152, 153, 154, 166, 168, 175, 180, and 185; Pigment Green 7, 10, and 36; Pigment Blue 15, 15:1, 15:2, 15:3, 15:4, 15:5, 15:6, 22, 24, 56, 60, 61, 62, and 64; Pigment Violet 1, 19, 23, 27, 29, 30, 32, 37, 40, and 50, and the like. These pigments can be used alone or in a combination of two or more. The amount of pigment used when blended with a resin is preferably from 0.0001 to 10 parts by mass relative to 100 parts by mass of the flame retardant resin composition.

As the dye, a commercially available dye can be used. Examples of the dye include an azo dye, an anthraquinone dye, an indigoid dye, a triaryl methane dye, a xanthene dye, an alizarin dye, an acridine dye, a stilbene dye, a thiazole dye, a naphthol dye, a quinoline dye, a nitro dye, an indamine dye, an oxazine dye, a phthalocyanine dye, a cyanine dye, and the like. These dyes can be used alone or in a combination of two or more. The amount of dye used when blended with a resin is preferably from 0.0001 to 10 parts by mass relative to 100 parts by mass of the flame retardant resin composition.

The composition of the present invention can be obtained by mixing essential components (A) to (C) with optional components (D) to (E) and other optional components if necessary. Any type of mixer can be used to mix the components. The components may be mixed under heat. Examples of the mixer that can be used include a turbula mixer, a henschel mixer, a ribbon blender, a V-type mixer, a W-type mixer, a super mixer, a nauta mixer, and the like.

The composition according to the present invention is effective for imparting flame retardancy to a resin, and is particularly useful as a flame retardant agent for use in a resin composition (also referred to as "resin additive"). The composition according to the present invention is preferably used as a flame retardant resin composition (hereinafter also referred to as "flame retardant resin composition according to the present invention") by being blended with a resin.

As the resin to which flame retardancy is imparted by the composition according to the present invention, a synthetic resin such as a thermoplastic resin or a thermosetting resin can be used. Specific examples of the thermoplastic resin include: thermoplastic resins such as a polyolefin-based resin, a biomass-containing polyolefin-based resin, a halogen-containing resin, an aromatic polyester resin, a linear polyester resin, a degradable aliphatic resin, a polyamide resin, a cellulose ester-based resin, a polycarbonate resin, a polyurethane resin, a polyphenylene oxide-based resin, a polyphenylene sulfide-based resin, and an acrylic resin; and blends thereof. On the other hand, examples of the thermosetting resin include a phenol resin, a urea resin, a melamine resin, an epoxy resin, an unsaturated polyester resin, and the like.

Other examples of the synthetic resin to which flame retardancy is imparted by the composition according to the present invention include an olefin-based thermoplastic elastomer, a styrene-based thermoplastic elastomer, a polyester-based thermoplastic elastomer, a nitrile-based thermoplastic elastomer, a nylon-based thermoplastic elastomer, a vinyl chloride-based thermoplastic elastomer, a polyamide-based thermoplastic elastomer, a polyurethane-based thermoplastic elastomer, and the like.

These resins may be used alone or in a combination of two or more. Also, the resins may be alloyed.

The resin used in the present invention can be used irrespective of molecular weight, the degree of polymerization, density, softening point, the proportion of an insoluble in a solvent, the degree of stereo-regularity, the presence or absence of catalyst residues, the type of monomer used as a raw material, the blending ratio of the monomer, the type of polymerization catalyst (for example, a ziegler catalyst, a metallocene catalyst, or the like), and the like.

Out of the various types of resins listed above, from the viewpoint of imparting excellent flame retardancy, it is preferable to use a polyolefin-based resin or a polyurethane-based thermoplastic elastomer. Examples of the polyolefin-based resin include polyethylene, low density polyethylene, linear low density polyethylene, high density polyethylene, polypropylene, homopolypropylene, a polypropylene random copolymer, a polypropylene block copolymer, a polypropylene impact copolymer, a polypropylene high impact copolymer, an isotactic polypropylene, a syndiotactic polypropylene, a hemi-isotactic polypropylene, a maleic anhydride-modified polypropylene, polybutene, a cycloolefin polymer, a stereoblock polypropylene, poly-3-methyl-1-butene, poly-3-methyl-1-pentene, poly-4-methyl-1-pentene, other α-olefin copolymers, an ethylene/propylene block or random copolymer, an ethylene-methyl methacrylate copolymer, an ethylene-vinyl acetate copolymer, other α-olefin copolymers, and the like.

As the polyurethane-based thermoplastic elastomer, a thermoplastic polyurethane resin (TPU) may be used. The thermoplastic polyurethane resin (TPU) is a rubber-like elastic body that has a urethane group (—NHCOO—) in its molecular structure, and includes a movable long chain portion called a soft segment and a very highly crystalline portion called a hard segment. Usually, it is produced using a polyol, a di-isocyanate, and a chain extender.

Also, thermoplastic polyurethane resin can be roughly classified into the following types according to the molding method: injection-type thermoplastic polyurethane resin that is injected into a mold while the resin is in a liquid state, and then cured; a type of thermoplastic polyurethane resin that is roll-kneaded, and then press-molded as with conventional rubber; and a type of thermoplastic polyurethane resin that that can be processed in the same manner as ordinary thermoplastic resin. However, in the present invention, any of the above thermoplastic polyurethane resins can be used.

Specific examples of the thermoplastic polyurethane resin include an ester (lactone)-based polyurethane copolymer, an ester (adipate)-based polyurethane copolymer, an ether-based polyurethane copolymer, a carbonate-based polyurethane copolymer, and an ether ester-based polyurethane copolymer. These thermoplastic polyurethane resins (TPU) can be used alone or in combination.

In the flame retardant resin composition according to the present invention, the amount of resin is preferably from 50 to 99.9 mass %, and more preferably from 60 to 90 mass %. In the case where the flame retardant resin composition contains the composition according to the present invention as a flame retardant agent, the flame retardant agent is contained in an amount of preferably from 10 to 400 parts by mass, and more preferably from 20 to 80 parts by mass relative to 100 parts by mass of the resin. By setting the amount of flame retardant agent to 10 parts by mass or more, sufficient flame retardancy is exhibited. By setting the amount of flame retardant agent to 400 parts by mass or less, physical properties that are inherent to the resin are unlikely to be impaired.

By molding the flame retardant resin composition according to the present invention, a molded article with excellent flame retardancy can be obtained. There is no particular limitation on the molding method. Examples of the molding method include extrusion processing, calender processing, injection molding, roll molding, compression molding, blow molding, and the like. A molded article of any shape such as a resin plate, a sheet, a film, or a variant can be produced.

The flame retardant resin composition according to the present invention and a molded body formed therefrom can be used in a wide variety of industrial fields such as the fields of electricity, electronics, and communication, electronic and engineering, agriculture, forestry and fisheries, mining, construction, food, fiber, clothing, medicine, coal, petroleum, rubber, leather, automobiles, precision equipment, wood, construction material, civil engineering, furniture, printing, and musical instruments. More specific examples include a printer, a personal computer, a word processor, a keyboard, a PDA (personal digital assistant), a telephone, a copy machine, a facsimile, an ECR (electronic cash register), a desk calculator, an electronic notepad, an electronic card, a holder, stationery, other stationary supplies, office automation equipment, a washing machine, a refrigerator, a vacuum cleaner, a microwave oven, a lighting apparatus, a gaming console, an iron, kotatsu (a Japanese table with an electric heater), a household appliance, a TV set, a VTR, a video camera, a radio-cassette recorder, a tape recorder, a minidisk, a CD player, a speaker, a liquid crystal display, audio-visual equipment, a connector, a relay, a condenser, a switch, a printed circuit board, a coil bobbin, a semiconductor sealing material, an LED sealing material, an electric wire, a cable, a transformer, a deflecting yoke, a power distribution board, a clock, electric and electronic parts, communication equipment, housing (frame, casing, cover, exterior) and parts of office automation equipment, and automobile interior and exterior materials. Out of these, in particular, the flame retardant resin composition according to the present invention and a molded body formed therefrom are preferably used in electronic parts such as electric wires and automobile parts such as automobile interior and exterior parts.

Furthermore, the flame retardant resin composition according to the present invention and a molded body formed therefrom are used in various types of applications including: materials for use in automobiles, hybrid cars, electric automobiles, vehicles, ships, aircraft, buildings, houses and architecture such as seats (fillings, outer materials, and the like), belts, ceiling coverings, convertible tops, armrests, door trims, rear package trays, carpets, mats, sun visors, wheel covers, mattress covers, air bags, insulating materials, hand holding rings, hand holding straps, electric wire covering materials, electric insulating materials, paints, coating materials, upholstery materials, floor materials, corner walls, carpets, wallpaper, wall covering materials, exterior materials, interior materials, roofing materials, decking materials, wall materials, pillar materials, deckings, fence materials, frameworks, moldings, windows, door profiles, shingles, panels, terraces, balconies, noise insulation boards, heat insulation boards, window materials; civil engineering materials; and houseware and sporting goods such as clothes, curtains, bed sheets, plywood boards, synthetic fiber boards, rugs, doormats, sheets, buckets, hoses, containers, glasses, bags, cases, goggles, ski plates, rackets, tents, and musical instruments.

EXAMPLES

Hereinafter, the present invention will be described in further detail by way of examples. However, the present invention is not limited to the examples given below. The numerical values shown in Tables 1 and 2 given below are expressed in parts by mass, and the peak heat release rate and the total heat release in Tables 1 and 2 are expressed in $kW \cdot m^{-2}$.

Preparation of Composition

Example Nos. 1 to 17 and Comparative Example Nos. 1 to 2

A polypropylene resin composition was obtained by blending the components listed in Tables 1 and 2 below with 0.1 parts by mass of calcium stearate (higher fatty acid metal salt), 0.1 parts by mass of tetrakis[3-(3,5-di-tert-butyl-4-hydroxyphenyl)methyl propionate]methane (phenol-based antioxidizing agent), and 0.1 parts by mass of tris(2,4-di-tert-butyl phenyl)phosphite (phosphorus-based antioxidizing agent) at the ratios shown in the tables and mixing them using a henschel mixer. Pellets were produced in the following manner using each of the resin compositions of the examples and the resin compositions of the comparative examples, and specimens for flame retardancy evaluation were produced from the produced pellets. The specimens were subjected to flame retardancy evaluation as follows.

Production of Pellets

Each of the resin compositions of Examples Nos. 1 to 17 and the resin compositions of Comparative Examples Nos. 1 to 2 that contained a polypropylene resin was melt kneaded at a cylinder temperature of 180 to 220° C. and a screw speed of 150 rpm using a biaxial extrusion molding machine (PCM30 available from Ikegai). Strands discharged from the mold were cooled using a cooling bus and cut using a pelletizer. In this way, pellets were produced.

Production of Specimens for UL-94V Evaluation

The obtained pellets were subjected to injection molding using a machine (NEX80-9E available from Nissei Plastic Industrial Co., Ltd.) at a screw temperature of 210 to 220° C. and a mold temperature of 40° C., and specimens for UL-94V evaluation, each with a length of 127 mm, a width of 12.7 mm, and a thickness of 1.6 mm, were obtained.

Production of Specimens for Peak Heat Release Rate Evaluation and Total Heat Release Evaluation The obtained pellets were subjected to injection molding using a machine (NEX80-9E available from Nissei Plastic Industrial Co., Ltd.) at a screw temperature of 210 to 220° C. and a mold temperature of 40° C., and specimens for peak heat release amount evaluation and total heat release evaluation, each with lengths of 100 mm×100 mm and a thickness of 3 mm, were obtained.

UL-94V Evaluation

Each of the obtained specimens for UL-94V evaluation with a length of 127 mm, a width of 12.7 mm, and a thickness of 1.6 mm was subjected to 20 mm vertical combustion test (UL-94V) in accordance with ISO 1210. Specifically, the specimen was held vertically, and a burner flame was applied to the lower end of the specimen for 10 seconds, and then the burner flame was removed. The time required for the flame on the specimen to extinguish was measured. Then, at the same time when the flame extinguished, a burner flame was applied for 10 seconds for the second time, and the time required for the flame on the specimen to extinguish was measured in the same manner as in the first time. Evaluation was also made by checking whether or not a cotton piece provided under the specimen caught fire by a flame dropping thereon. Flame retardancy rating was determined in accordance with the UL-94V standard based on the first combustion time, the second combustion time, whether or not the cotton piece caught fire, and the like. As the flame retardancy rating, V-0 indicates the highest level, and flame retardancy decreases in the order of V-1 to V-2. A rating of NR is given when a specimen does not correspond to any of the ratings V-0 to V-2. Tables 1 and 2 below show the evaluation results. If a rating of V-1 or higher was achieved out of the flame retardancy ratings, the flame retardancy was evaluated as being high.

Peak Heat Release Rate Evaluation and Total Heat Release Evaluation

Each of the obtained specimens with lengths of 100 mm×100 mm and a thickness of 3 mm was subjected to peak heat release rate evaluation (Heat Release Rate) and total heat release evaluation (Total Heat Release Rate) at a heat flow of 50 kW·m$^{-2}$ using a cone calorimeter (CONE III available from Toyo Seiki Seisaku-sho, Ltd.) in accordance with ISO 5660. Tables 1 and 2 below show the evaluation results. The lower the peak heat release rate was or the lower the total heat release was, the higher the flame retardancy was evaluated as being.

Color Tone

Each of the obtained specimens with lengths of 100 mm×100 mm and a thickness of 3 mm was subjected to color tone (Y.I) evaluation using a Color Eye 7000A available from X-Rite Inc. Tables 1 and 2 below show the evaluation results. The lower the Y.I was, the better the color tone was evaluated as being.

TABLE 1

| | | Example No. | | | | | | | | | | | | | | | | |
|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 |
| Resin | Polypropylene *1) | 70 | 70 | 72 | 72 | 72 | 70 | 70 | 70 | 70 | 70 | 72 | 72 | 72 | 70 | 70 | 70 | 70 |
| Component (A) | Melannne pyrophosph | 12 | 12 | 11 | 11 | 11 | 12 | 12 | | 12 | 12 | 11 | 11 | 11 | 12 | 12 | 12 | 12 |
| | Ammonium | | | | | | | | 30 | | | | | | | | | |
| Component (B) | Piperazine pyrophosph | 18 | 18 | 17 | 17 | 17 | 18 | 18 | | 18 | 18 | 17 | 17 | 17 | 18 | 18 | 18 | 18 |
| Component (C) | Hydrous magnesium silicate | 0.1 | 1 | 2 | 4 | 10 | 20 | 50 | 5 | | | | | | | | 0.08 | 52 |
| | Hydrous magnesium silicate | | | | | | | | | 0.1 | 1 | 2 | 4 | 10 | 20 | 50 | | |
| Component (D) | Zinc oxide *4) | | | 1.4 | 1.4 | 1.4 | | | | | | 1.4 | 1.4 | 1.4 | | | | |
| Component (E) | Silicone oil *5) | 0.1 | | | | | | | | 0.1 | | | | | | | | |
| | Epoxy-coupling based | | | 0.3 | 0.3 | 0.3 | | | | | | 0.3 | 0.3 | 0.3 | | | | |
| | Lubricant *7) | | | 0.03 | 0.03 | 0.03 | | | | | | 0.03 | 0.03 | 0.03 | | | | |
| | UL-94V | V-1 | V-1 | V-0 | V-0 | V-0 | V-1 | V-1 | V-1 | V-1 | V-1 | V-0 | V-0 | V-0 | V-1 | V-1 | V-1 | V-1 |

TABLE 1-continued

| | Example No. | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| Peak heat release rate | 85 | 85 | 84.8 | 26.8 | 25.3 | 40.2 | 55.3 | 75 | 85 | 85 | 84.8 | 26.8 | 25.5 | 45.8 | 60.9 | 85 | 85 |
| Total heat release (10 min.) | 30.9 | 25 | 20.4 | 8.1 | 8 | 23.5 | 24.1 | 23 | 30.9 | 25 | 23.5 | 22.3 | 21.2 | 24 | 24.8 | 30.9 | 25 |
| Color tone (Y.I) | 21 | 20.2 | 16.7 | 17.1 | 17.3 | 18 | 22.1 | 19 | 15 | 14.1 | 11.1 | 13.9 | 17.3 | 18 | 22.1 | 21 | 30 |

*1) Melt flow rate = 30 g/10 mm, the melt flow rate being measured at 230° C. under a load of 2.16 kg in accordance with JIS K7210
*2) Adins Clay 80 T (available from Tolsa Group, silane modified sepiolite)
*3) Adins Clay SS2 20 (available from Tolsa Group, silane modified sepiolite)
*4) Zinc oxide class 1 (available from Mitsui Mining & Smelting Co., Ltd.)
*5) KF-99 (available from Shin-Etsu Chemical Co., Ltd.)
*6) Molecular weight: 246.4 and specific gravity: 1.07 (available from Nichibi Trading Co., Ltd.)
*7) Adipic acid ether ester-based lubricant [molecular weight: 434, specific gravity: 1.020, and SP value: 9.2] (available from ADEKA)

TABLE 2

| | | Comparative Example No. | |
|---|---|---|---|
| | | 1 | 2 |
| Resin | Polypropylene *1) | 70 | 68 |
| Component (A) | Melamine pyrophosphate Ammonium polyphosphate | 12 | 13 |
| Component (B) | Piperazine pyrophosphate | 18 | 19 |
| Component (D) | Zinc oxide *4) | 1.4 | 1.4 |
| | Epoxy-based coupling agent *6) | 0.3 | 0.3 |
| | Lubricant *7) | 0.03 | 0.03 |
| UL-94V | | V-2 | V-2 |
| Peak heat release rate | | 90 | 87.4 |
| Total heat release (10 min.) | | 33 | 30.9 |
| Color tone (Y.I) | | 14 | 14 |

*1) Melt flow rate = 30 g/10 min, the melt flow rate being measured at 230° C. under a load of 2.16 kg in accordance with JIS K7210
*4) Zinc oxide class 1 (available from Mitsui Mining & Smelting Co., Ltd.)
*6) Molecular weight: 246.4 and specific gravity: 1.47 (available from Nichibi Trading Co., Ltd..)
*7) Adipic acid ether ester-based lubricant [molecular weight: 434, specific gravity: 1.020, and Si value: 9.2] (available from ADEKA)

As is clear from the results shown in Tables 1 and 2, the resins of the examples in which a composition containing the component (A), the component (B), and the component (C) was used exhibited good results in all flame retardancy evaluations of the UL-94V evaluation, the peak heat release rate evaluation, and the total heat release evaluation, and good results also in color tone. In contrast, the resins of the comparative examples in which a composition not containing the component (C) was used exhibited insufficient results in the flame retardancy evaluation.

Accordingly, it can be seen that the composition according to the present invention can impart high levels of flame retardancy to a resin, and is therefore excellent as a flame retardant agent.

The invention claimed is:

1. A composition comprising a component (A) below and/or a component (B) below, and a component (C) below:
the component (A) being a (poly)phosphate compound represented by Formula (1)

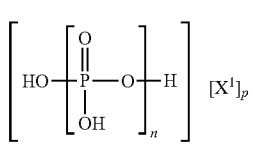
(1)

wherein n represents a number of 1 to 100, $X^1$ represents a triazine derivative that is represented by Formula (2), and p represents a number that satisfies $0<p \le n+2$

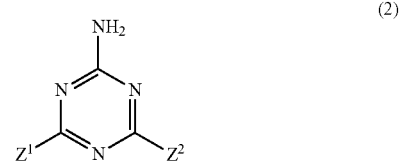
(2)

wherein $Z^1$ and $Z^2$ each independently represent a group selected from the group consisting of a $-NR^1R^2$ group, a hydroxyl group, a mercapto group, a linear or branched alkyl group having 1 to 10 carbon atoms, a linear or branched alkoxy group having 1 to 10 carbon atoms, a phenyl group, and a vinyl group, and $R^1$ and $R^2$ each independently represent a hydrogen atom, a linear or branched alkyl group having 1 to 6 carbon atoms, or a methylol group;

the component (B) being a (poly)phosphate compound represented by Formula (3)

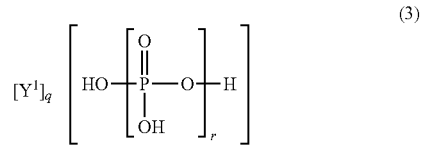
(3)

wherein r represents a number of 1 to 100, $Y^1$ represents diamine containing $[R^3R^4N(CH_2)_mNR^5R^6]$, piperazine, or a piperazine ring, $R^3$, $R^4$, $R^5$ and $R^6$ each independently represent a hydrogen atom, or a linear or branched alkyl group having 1 to 5 carbon atoms, m represents an integer of 1 to 10, and q represents a number that satisfies $0<q \le r+2$;

the component (C) being an organic modified sepiolite;
the organic modified sepiolite of the component (C) is modified using organic silane; and
the component (C) being contained in an amount of 7.1 to 35.7 parts by mass relative to 100 parts by mass of a total of the components (A) and (B).

2. The composition according to claim 1, wherein the component (C) is contained in an amount of 14.3 to 35.7 parts by mass relative to 100 parts by mass of a total of the components (A) and (B).

3. The composition according to claim 1, further comprising zinc oxide as a component (D) in an amount of 0.01 to 10 parts by mass relative to 100 parts by mass of a total of the components (A) and (B).

4. The composition according to claim 1, further comprising at least one selected from the group consisting of silicone oil, an epoxy-based coupling agent, and a lubricant as a component (E) in an amount of 0.01 to 5 parts by mass relative to 100 parts by mass of a total of the components (A) and (B).

5. The composition according to claim 1, wherein the components (A) and (B) are contained, the component (A) is melamine pyrophosphate, and the component (B) is piperazine pyrophosphate.

6. A flame retardant agent comprising the composition according to claim 1.

7. A flame retardant resin composition comprising the flame retardant agent according to claim 6 in an amount of 10 to 400 parts by mass relative to 100 parts by mass of the resin.

8. A molded article formed from the flame retardant resin composition according to claim 7.

9. A method for imparting flame retardancy to a resin, the method comprising mixing a composition that contains a composition comprising a component (A) below and/or a component (B) below, and a component (C) below with a resin:

the component (A) being a (poly)phosphate compound represented by Formula (1)

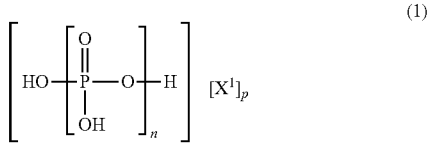

wherein n represents a number of 1 to 100, $X^1$ represents a triazine derivative that is represented by Formula (2), and p represents a number that satisfies $0<p \leq n+2$

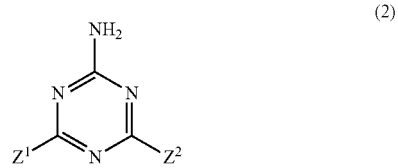

wherein $Z^1$ and $Z^2$ each independently represent a group selected from the group consisting of a $—NR^1R^2$ group, a hydroxyl group, a mercapto group, a linear or branched alkyl group having 1 to 10 carbon atoms, a linear or branched alkoxy group having 1 to 10 carbon atoms, a phenyl group, and a vinyl group, and $R^1$ and $R^2$ each independently represent a hydrogen atom, a linear or branched alkyl group having 1 to 6 carbon atoms, or a methylol group;

the component (B) being a (poly)phosphate compound represented by Formula (3)

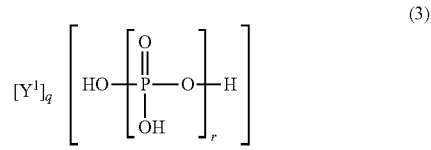

wherein r represents a number of 1 to 100, $Y^1$ represents diamine containing $[R^3R^4N(CH_2)_mNR^5R^6]$, piperazine, or a piperazine ring, $R^3$, $R^4$, $R^5$ and $R^6$ each independently represent a hydrogen atom, or a linear or branched alkyl group having 1 to 5 carbon atoms, m represents an integer of 1 to 10, and q represents a number that satisfies $0<q \leq r+2$;

the component (C) being an organic modified sepiolite;

the organic modified sepiolite of the component (C) is modified using organic silane; and the component (C) being contained in an amount of 7.1 to 35.7 parts by mass relative to 100 parts by mass of a total of the components (A) and (B).

10. The composition according to claim 2, further comprising zinc oxide as a component (D) in an amount of 0.01 to 10 parts by mass relative to 100 parts by mass of a total of the components (A) and (B).

11. The composition according to claim 2, further comprising at least one selected from the group consisting of silicone oil, an epoxy-based coupling agent, and a lubricant as a component (E) in an amount of 0.01 to 5 parts by mass relative to 100 parts by mass of a total of the components (A) and (B).

12. The composition according to claim 3, further comprising at least one selected from the group consisting of silicone oil, an epoxy-based coupling agent, and a lubricant as a component (E) in an amount of 0.01 to 5 parts by mass relative to 100 parts by mass of a total of the components (A) and (B).

13. The composition according to claim 2, wherein the components (A) and (B) are contained, the component (A) is melamine pyrophosphate, and the component (B) is piperazine pyrophosphate.

14. The composition according to claim 3, wherein the components (A) and (B) are contained, the component (A) is melamine pyrophosphate, and the component (B) is piperazine pyrophosphate.

15. The composition according to claim 4, wherein the components (A) and (B) are contained, the component (A) is melamine pyrophosphate, and the component (B) is piperazine pyrophosphate.

16. A flame retardant agent comprising the composition according to claim 2.

17. A flame retardant agent comprising the composition according to claim 3.

18. A flame retardant agent comprising the composition according to claim 4.

19. A flame retardant agent comprising the composition according to claim 5.

20. The composition according to claim 10, further comprising at least one selected from the group consisting of silicone oil, an epoxy-based coupling agent, and a lubricant as a component (E) in an amount of 0.01 to 5 parts by mass relative to 100 parts by mass of a total of the components (A) and (B).

* * * * *